Nov. 20, 1945.  C. W. HANSELL  2,389,432
COMMUNICATION SYSTEM BY PULSES THROUGH THE EARTH
Filed June 24, 1942  3 Sheets-Sheet 1

INVENTOR
Clarence W. Hansell
BY H. S. Grover
ATTORNEY

Nov. 20, 1945.     C. W. HANSELL     2,389,432
COMMUNICATION SYSTEM BY PULSES THROUGH THE EARTH
Filed June 24, 1942     3 Sheets-Sheet 2

INVENTOR
Clarence W. Hansell
BY
ATTORNEY

Nov. 20, 1945.   C. W. HANSELL   2,389,432
COMMUNICATION SYSTEM BY PULSES THROUGH THE EARTH
Filed June 24, 1942   3 Sheets-Sheet 3
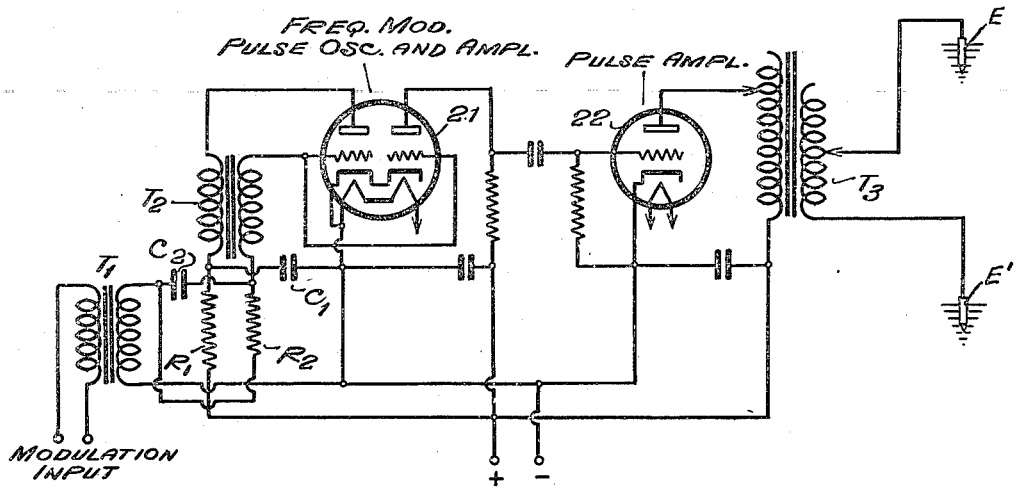
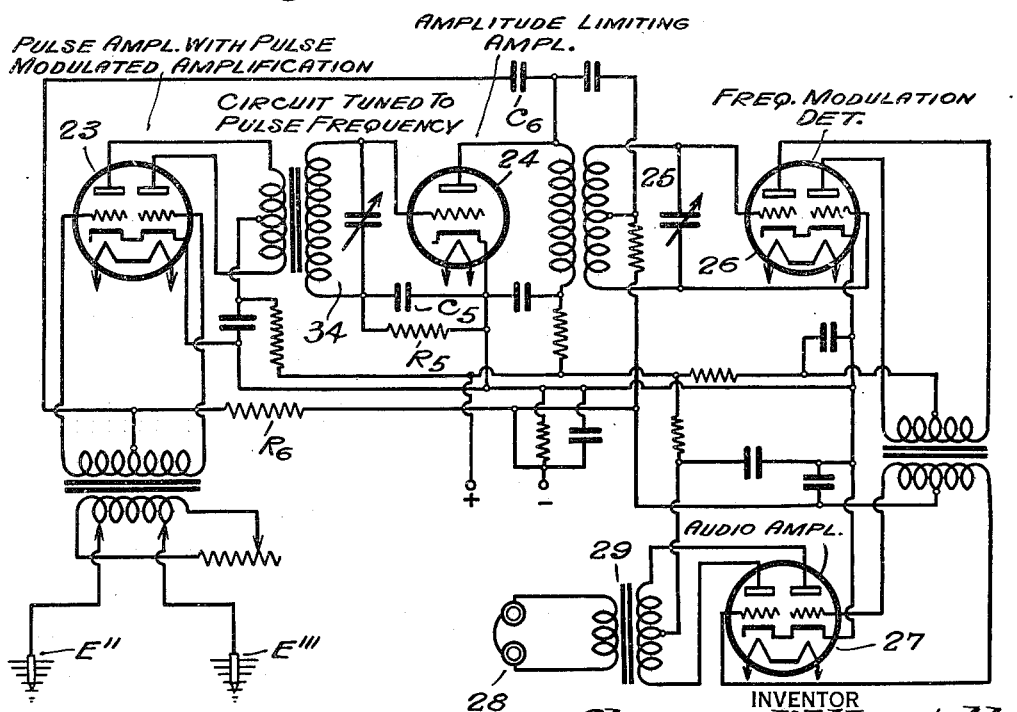
INVENTOR
Clarence W. Hansell
BY
ATTORNEY Patented Nov. 20, 1945

2,389,432

UNITED STATES PATENT OFFICE 2,389,432

COMMUNICATION SYSTEM BY PULSES THROUGH THE EARTH

Clarence W. Hansell, Port Jefferson, N. Y., assignor to Radio Corporation of America, a corporation of Delaware Application June 24, 1942, Serial No. 448,223

20 Claims. (Cl. 250—3)

The present invention relates to an improved earth signaling communication system, employing electrical pulses.

Briefly stated, the invention consists in the use of very short high-power pulses delivered by the transmitter to two spaced ground connections, and likewise received by connecting a receiver between two spaced ground connections. These ground connections may comprise two ground electrodes which can be inserted into the earth a suitable distance apart, such as 100 feet more or less. The effectiveness and range of the system will, of course, vary with the distance between the ground connections, and by trial and error it is a comparatively simple matter to determine the minimum distance between earth connections for a particular range of communication. Generally speaking, the further apart the two ground connections of the transmitter, and of the receiver, are placed, the greater will be the distance range of communication, within certain limits. The term "ground or earth connections" used herein, is not limited to a connection in the soil, since the electrodes for the transmitter as well as for the receiver, can be located in water, such as in a lake, or in the ocean for communication between two ships or between a ship (or a submarine) and a shore station. It will be apparent that when the spaced electrodes are inserted in the ground or in the water, that the effectiveness of the system may vary with the resistance of the earth, or the water. There is, however, a compensating effect in respect to the effect of ground resistivity, because signals and noise tend to be influenced alike, leaving their ratios more or less alike, except for conditions where receiver noise limits the range of communication.

The communication system of the invention, employing short high-power pulses, has both military and civilian uses, and possesses the following advantages among others: (1) A higher peak power can be transmitted than obtainable by the customary type of continuous wave transmitter equipment; (2) the system of the invention is very hard to interfere with; consequently the procedure known as "jamming" by an enemy in time of war has reduced effect; and (3) by making the receiver of the invention operate synchronously with the transmitter, or by using an adjustable threshold system in addition to limiting, it is possible to receive transmitted pulse signals despite extraneous and undesirable earth potentials.

The following is a more detailed description of the invention accompanied by the drawings wherein Fig. 1 illustrates graphically, by way of example only, three conditions for transmitted pulses, which can be obtained in a transmitter of the invention;

Fig. 2 illustrates a pulse type transmitter circuit in accordance with the invention;

Fig. 3 graphically illustrates the action of the pulsing tubes of Fig. 2;

Fig. 5 illustrates another pulse type transmitter; and

Fig. 6 illustrates another pulse type receiving system.

Generally, I propose to transmit short pulses separated by relatively large spaces, and to modify the relative timing, or the pulse rate, or the pulse amplitude, or the pulse frequency, or the pulse length, of successive pulses, in accordance with a useful modulation. Thus, considering one type of modulation wherein the relative timing or pulse positions of successive pulses is involved, if successive pulses are numbered 1, 2, 3, 4, 5, etc., one polarity of modulation potential will move pulses 1 and 2, 3 and 4, 5 and 6, etc., closer together, but will move pulses 2 and 3, 4 and 5, 6 and 7, etc., further apart by an equal amount. These pulses are preferably extremely short and may have a duration of 10 microseconds or less with relatively long spaces between the pulses. As an example, I contemplate using 0.5 microsecond pulses repeated at a rate of 20,000 pulses per second, as an equivalent carrier wave for carrying on telephone communication. Such a condition would involve transmitting pulses for perhaps 1% or so of the time that the transmitter is on. One of the simplest and best methods of modulation is to vary the pulse frequency or repetition rate, keeping the pulse amplitude more or less constant. However, where greater secrecy or privacy of communication is desired, I may keep the pulse rate constant but vary the relative timing of successive pulses. With this type of pulse timing modulation, there is no change in this average transmitter output power and current, in response to modulation, but only a variation in time spacing between adjacent or successive pulses. By means of this timing variation or modulation, I am able to carry out any kind of communication, provided the pulse rate or frequency is sufficiently greater than the highest significant modulating frequency.

Figure 1:
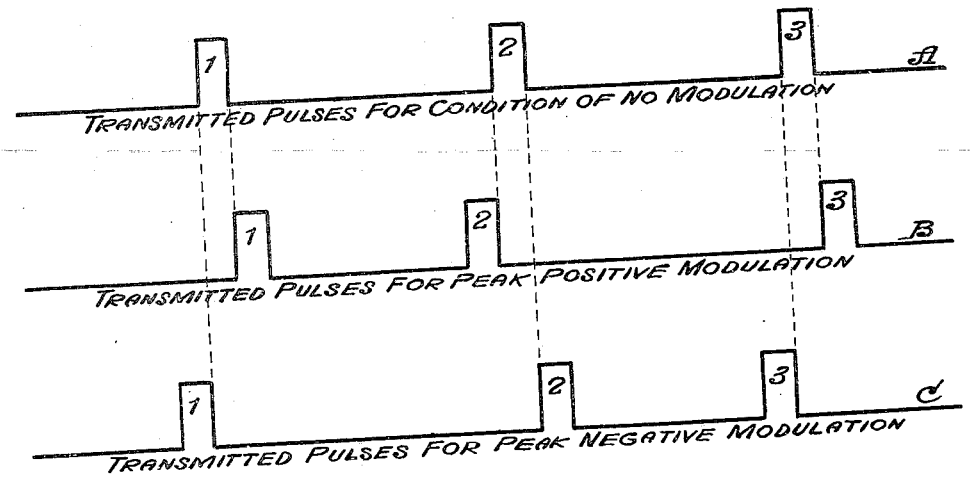

In Fig. 1 there are illustrated three pulse conditions A, B and C which might be obtained in a system if we assume that the shift in timing of each pulse is a maximum equal to the time length of each pulse. If the pulse rate is say 15,000 cycles per second, and the length of each pulse if $(1 \div 150,000) \times (10)^6 = 6.67$ microseconds)

then useful modulation may be assumed to have caused shifts in timing of individual pulses of 6.67 microseconds (equivalent to width of a pulse) for conditions B and C of Fig. 1, with respect to the timing for the unmodulated condition illustrated in A. It should be noted that for condition B, representing one polarity of modulation, the pulses 1 and 2 are closer together while pulses 2 and 3 are further apart relative to their respective times of occurrence in condition A which represents the unmodulated condition. Similarly, for condition B, pulses 3 and 4 and also pulses 5 and 6 will be closer together, while pulses 4 and 5, as well as 6 and 7, will be further apart. For condition C representing the other polarity of modulation, pulses 1 and 2 and also pulses 3 and 4 are further apart, while pulses 2 and 3 as well as pulses 4 and 5 are closer together in point of time relative to the timing for condition A.

Figure 2:
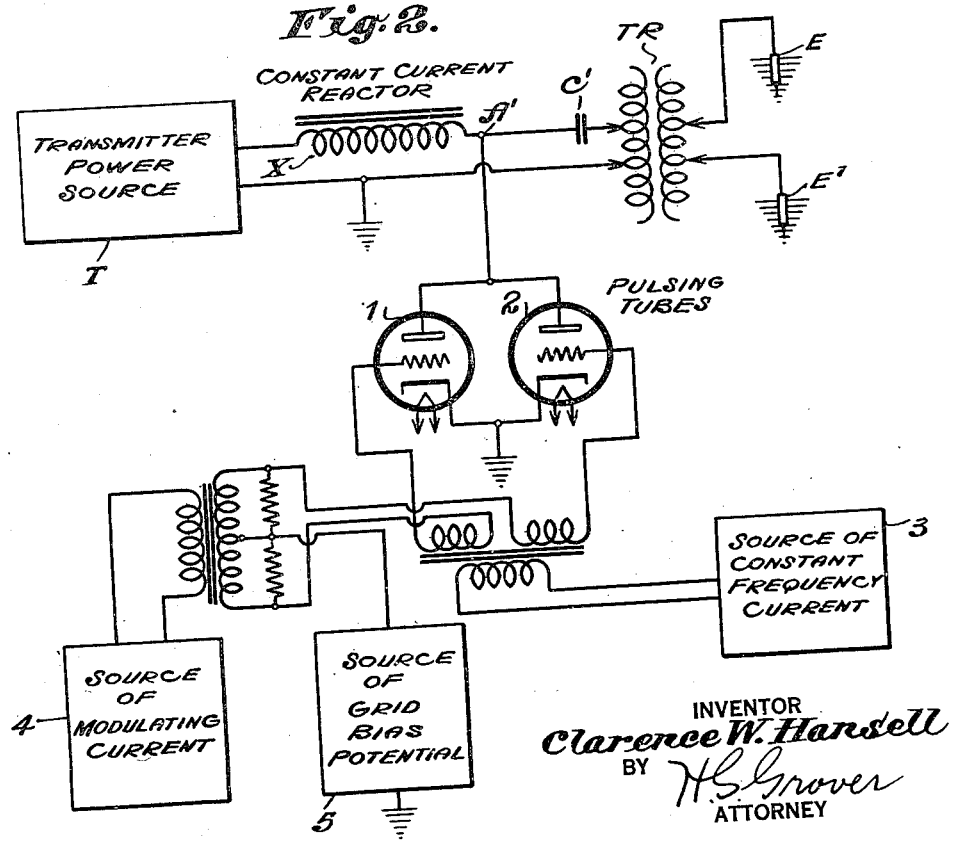

Fig. 2 schematically illustrates one transmitter circuit in accordance with the invention for producing and transmitting pulse signals of the character illustrated in Fig. 1. In Fig. 2, direct current from a transmitter power source T is held at a substantially constant value by means of a constant current high inductance reactor X, in a manner similar to that found in the Heising constant current transmitter modulation system. This reactor must be one so designed as to maintain a high reactance over a very broad band of frequencies, including the pulse repetition frequency and extending up to the frequencies required by the pulses. Such reactor systems have been developed for use in prior pulsing and television systems.

Source T supplies anode potential for the anodes of the two pulsing vacuum tubes. The current from the reactor divides itself at point A' into two paths. One path is to the transformer TR, and the other path is to the pair of pulsing vacuum tubes 1 and 2.

When proper electrical constants are used, one or the other of the pulsing tubes 1, 2 pass current at a relatively low potential for most of the time but both tubes cut off their currents to cause source T and the reactor X to send short current pulses at relatively high potential to the transformer TR and thence to the spaced earthed electrodes E and E'. By means of the transformer TR, I am able to present an optimum value of load to the pulse transmitter by suitably adjusting the leads on both the primary and secondary coils of the transformer to the proper taps. The output pulse delivered to the electrodes E and E' is formed of a sharp high positive and a broad low negative impulse, both of which occurring immediately after each other constitute a cycle of output current. The condenser C' serves to isolate the D. C. power source from being short circuited through the transformer TR. This combination, when properly designed and constructed, results in good power efficiency. While the pulsing tubes are passing current, i. e., conductive, there is a tendency for current through the reactor X to increase and while the tubes do not pass current, i. e., non-conductive, there is a tendency for the current to decrease. The low potential to ground from the reactor output terminal between A' and ground for relatively long time periods, and the high potential for relatively short time periods (pulse periods) provide an average value substantially equal to the potential from the transmitter power source T. During these relatively short time periods the high potential supplied to the electrodes E and E' greatly exceeds the normal voltage supplied by T. Putting it another way, while vacuum tubes 1 and 2 pass current, there is a voltage drop through these tubes which is small, and, in effect, there is a low resistance short-circuit across reactor X for which reason the current through the reactor tends to increase. When the pulsing vacuum tubes 1, 2 become non-conductive for spaced relatively short time periods, the short circuit path across reactor X is removed, thus giving rise to an inductive potential from reactor X which is applied to the transformer terminals with much higher value than the potential of source T. The reactor X, by holding substantially constant current, forces a peak current into the transformer TR having a value substantially equal to the current from terminal A' through tubes 1 and 2, but at a much higher momentary potential and power level. The current in reactor X stores energy in the magnetic field of the reactor so that the current cannot be diminished except by using up some of the stored energy.

The control electrodes of the pulsing tubes are supplied with a direct current biasing potential from a rectifier 5, and also supplied with alternating current from two sources 3 and 4. Source 3 is a "source of constant frequency current" which may operate at 7500 cycles per second if it is desired to transmit 15,000 cycles per second. Current from this source 3 is applied to the pulsing tube control electrodes in push-pull or 180° phase relation. Source 4 is a source of modulating current which is to be transmitted. It may be made up of telephone, multiplex-telegraph, facsimile, or other types of signaling current. If ordinary conversational telephone modulation is employed for source 4, it is preferred that the range of telephone frequencies be between 150 and 3000 cycles. Input from source 4 is also applied to the control electrodes of the pulsing tubes in push-pull or 180° phase relation.

Figure 3:
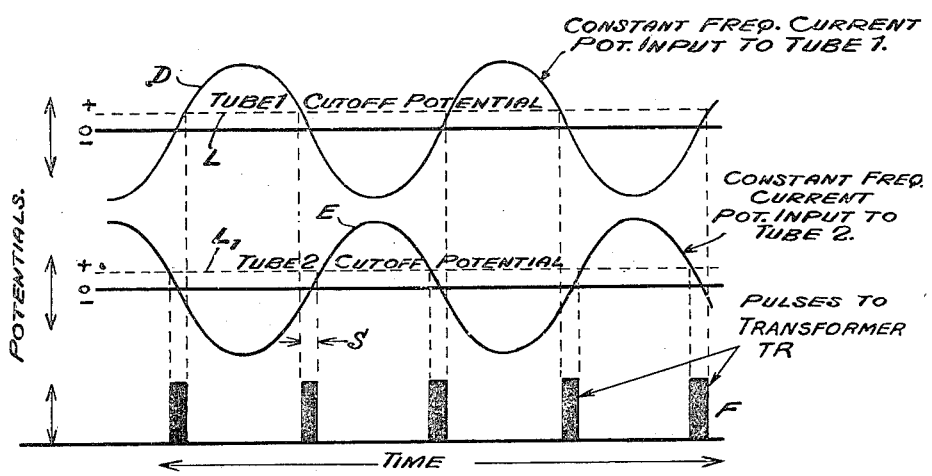

When there is no modulation input applied from source 4, one or the other of the pulsing tubes 1, 2 is passing anode current at all times except when the input from the source of constant frequency current 3 is near the zero value of each cycle. Then both pulsing tubes 1 and 2 cut off current at the same time, i. e., are simultaneously non-conductive, and cause a short and sharp pulse of current at relatively high potential to be passed into the transformer TR. For this unmodulated condition, the pulses transmitted from the spaced ground electrodes are uniformly spaced with respect to time. Fig. 3 illustrates qualitatively the action of the tubes in producing the pulses. Curves D of Fig. 3 represents the potential input, with respect to time, supplied to pulsing tube 1 by source 3 while curve E represents the potential input supplied to pulsing tube 2 by the same source 3. Both of these curves are shown as sine wave curves. The dotted lines L and L₁ indicate the current cut-off potential point for tubes 1 and 2 respectively. It should be noted that both tubes are simultaneously non-conductive only during a short time interval S near the zero value of both curves. Graph F indicates that pulses are produced only during the short times that both pulsing tubes are simultaneously non-conductive.

If, momentarily, modulation from source 4 produces a differential variation in bias potential on the grids of pulsing tubes 1 and 2, then alternate pairs of pulses will draw together. The tubes will act as though the bias on one pulsing tube were increased and the bias on the other pulsing tube were decreased. Reversing the differential potential will push these same alternate pairs of pulses apart. A complex wave form of modulating potential will produce a corresponding pulse timing modulation which may be utilized for communication purposes.

Figure 4:
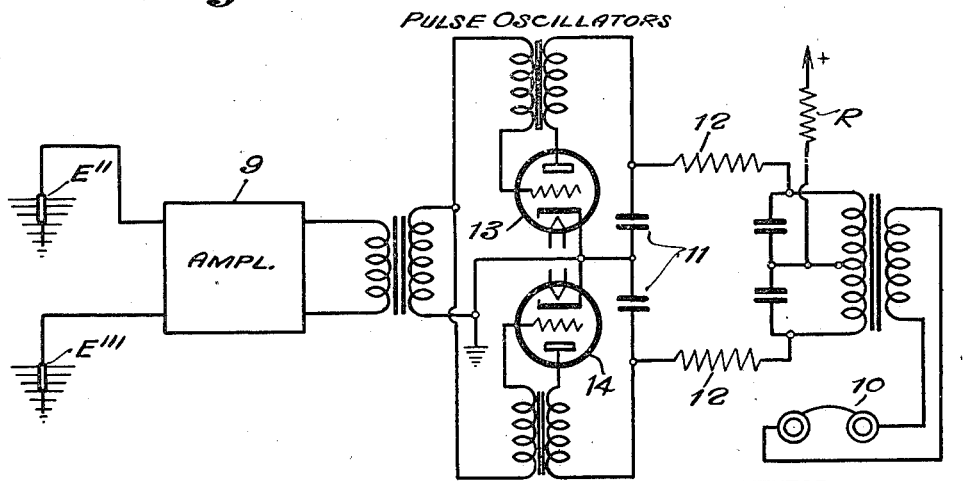
Fig. 4 illustrates a receiving system in accordance with the invention, for use with the transmitter of Fig. 2.

To receive signals or modulations transmitted from the equipment of Fig. 2, I may employ a receiving system of the kind illustrated in Fig. 4. In this system a receiver is utilized to provide an output current determined by the time modulated pulses from the transmitter. A pair of spaced earthed electrodes E", E''' collects the pulse signals and passes them on to the amplifier 9 which may be the equivalent of a television type wide band video amplifier. The pulses from 9 are delivered to two pulsing oscillators 13, 14, similar to those used to produce saw tooth potentials in television receivers, each adjusted to have a natural period of oscillation (7500 cycles) substantially equal to half the average frequency of the pulses from the transmitter. The pulse oscillators 13 and 14 are provided with a common anode circuit resistance R for the purpose of making them tend to operate substantially 180° out of phase. The received pulses are utilized to synchronize the operation of the pulse oscillators and, obviously, alternate received pulses are automatically effective in controlling the timing of each oscillator 13 or 14. However, each pair of received pulses produces opposite effects upon the timing of the oscillators 13 and 14 and these effects balance out so far as the pulsing rate of the combined oscillators is concerned. When a received pulse advances the time of tripping of one oscillator 13 or 14, it retards the time of tripping of the other 14 or 13. Both pulse oscillators are locked together through the common anode circuit resistance R and the other circuits so that, in effect, the received pulses modulate the phase or timing of oscillations of each pulse oscillator but not the oscillation frequency. During the time when both pulse oscillators 13 and 14 are not passing current, the condensers 11, 11 are being charged up through resistors 12, 12. The rate of charging of these condensers controls the timing or natural frequency of the operation of the pulse oscillators. In effect, the time constants of condensers 11, 11 and resistors 12, 13, in combination with the tube potential adjustments, controls the operating frequency. The received pulses serve to differentially vary the tripping time of the oscillators, thus differentially varying the average current passing through the oscillator tubes. The common anode resistor R also affects the operating frequency to some extent because the drop in the resistor affects the input potential and therefore the charging rate of condensers 11, 11 through resistors 12, 12.

Once the oscillations have dropped into synchronism with the received pulses, the average anode currents to the pulse oscillator tubes 13 and 14 will be differentially modulated by the pulse modulation and this differential current may be utilized to provide the useful modulation output from the receiving system which can be heard in the headphones 10 or recorded by some equivalent circuit.

The polarity of the audio output from the pulse oscillators 13, 14 with respect to the pulse modulation, will be in one direction or the other, depending upon the phase relations which happen to be established when the locking of the receiving oscillators 13 and 14 by transmitted pulses is started.

The system just described provides a considerable degree of privacy or secrecy since any ordinary amplitude, phase, or frequency modulation receiver now known or utilized in the art will be substantially unresponsive to the type of modulation provided. Intelligible reception is, in general, only possible with equipment specially designed and adjusted to operate at the pulse frequencies utilized at the transmitter and with the type of modulation proposed.

Because the receiver pulse oscillators 13 and 14 are in a condition to be tripped by received power for only brief time periods including the time periods occupied by transmitted pulses, there will be an improvement in the signal to noise ratio and also less interference from undesired signals. Noise occurring during spacing periods will have no effect because the oscillators 13, 14 are not in a condition to trip during these periods.

Circuits ahead of the receiver pulse oscillators must be made broad enough in frequency pass band to pass the pulses. This is a band width greater than that required to pass double side bands of the useful modulation alone. As a result of the broadness in band width, ignition and similar man made noises are much shorter in time duration than they would be in the common type of receiver now in use. This reduces the probability of a noise pulse affecting the receiver pulsing oscillators.

The effective or narrowest selectivity of the system appears in the action of the receiver pulse oscillators which may have an effective selectivity as great as desired by controlling the amount of energy from the receiver utilized to control the oscillators and by controlling the degree to which each oscillator can determine its own timing. The degree of locking between the two oscillators, tending to make them operate 180° out of phase, is controllable to control the sensitivity of the pulsing oscillators as detectors. To summarize, by controlling the pulse input power, the degree of locking between the pulse oscillators, and the other electrical adjustments, I can control the effective selectivity and sensitivity of the final detector of the system over a large range.

An alternative and simpler system, where secrecy or privacy is less important is illustrated in Figs. 5 and 6. Fig. 5 is a simplified schematic diagram of the transmitter and Fig. 6 is a schematic diagram of the receiver.

Referring to Fig. 5 I have shown a frequency modulated pulse oscillator and amplifier comprising double element vacuum tube amplifier 21. One part of tube 21 is provided with regenerative feedback transformer $T_2$ and the time constant circuit made up of resistance $R_1$ and condenser $C_1$. The resistance $R_2$ and condenser $C_2$ provide grid bias to the control electrode of the oscillator part of tube 21 and, if desired, may provide a time constant such as to contribute to the frequency of pulse oscillation.

The left hand portion of tube 21 constitutes the generator side, while the right hand portion of tube 21 is the amplifier side for the pulses produced in the generator side. Tube 22 is an amplifier which amplifies the output from the amplifier side of tube 21. The output from amplifier 22 is passed through transformer $T_3$ to the ground connections E, E'. The primary and secondary windings of transformer $T_3$ are adjustable, as shown, to obtain the proper impedance match to the connecting circuits.

In the operation of the system of Fig. 5, the oscillator electrode structure of tube 21 receives anode potential by the charging of condenser $C_1$ through resistance $R_1$. When the anode potential rises high enough anode current starts, causing transformer $T_2$ to push the oscillator control electrode momentarily positive, thereby causing a rapid discharging of condenser $C_1$ and a charging of condenser $C_2$. The anode current then cuts off, leaving the anode potential low and control electrode bias potential high. Then, after a time, the bias potential decreases by leakage of charge from condenser $C_2$ through resistance $R_2$, while the anode potential rises by charging of condenser $C_1$ through resistance $R_1$, ending in another pulse of anode and grid current. This process repeated at rapid intervals, say at a rate of 20,000 pulses per second, with the pulses very short compared to the time intervals between them, provides the pulse oscillation.

To modulate the frequency of the pulse oscillation a modulating potential is applied through transformer $T_1$ and the parallel combination of resistance $R_2$ and condenser $C_2$. This causes a variation or modulation in the oscillator grid bias potential which causes anode current to start at variable time intervals following preceding pulses and thereby modulates the pulse frequency.

The modulation may, as an example, comprise voice frequencies ranging from say 150 to 3000 cycles per second, and may be of such an amplitude as to modulate the pulse frequency by a maximum of plus and minus 3000 to 6000 cycles per second.

The frequency modulated pulses are amplified in the amplifier portion of tube 21 and again in tube 22 from which relatively high power pulses are delivered to the spaced ground connections E, E' through impedance adjusting transformer $T_3$.

At the receiver of Fig. 6, pulse power picked up by the spaced ground connections E'', E''' is amplified in push-pull pulse amplifier 23 and applied to a frequency selective circuit 34, tuned to the mean pulse frequency but broad enough in response to respond to the frequency modulation of the pulses. Energy from the tuned circuit is again amplified and limited to nearly constant value in amplifier 24. The limiting is accomplished largely by virtue of automatic control electrode bias which increases with increasing input, supplied by resistance $R_5$ shunted by condenser $C_5$. The resistance and condenser are so chosen as not to respond much to frequencies above the lowest modulation frequency.

Output from amplifier 24 is then applied to a frequency modulation detector comprised of discriminator circuit 25 and push-pull demodulator tube 26. Modulation frequency output from demodulator 26 is amplified in audio amplifier 27 and passed on to headphones 28 through a coupling transformer 29.

In order to prevent or reduce the probability that noise and interference, arriving at the receiver between the arrivals of the signal pulses, may be heard in the headphones I provide a feedback path through $C_6$ to the control electrode bias resistor $R_6$. As a result of this feedback, the sensitivity or amplification of vacuum tube 23 is modulated by the output A. C. potential of tube 24 in such a direction as to make the amplification maximum when a signal pulse is due to arrive but to make it a lower value for all other time periods between pulses. This is not regeneration of the signal in the ordinary sense since, due to the balanced arrangement of the circuits associated with tube 23, the energy fed back is not reamplified.

In operation, the receiving system may be designed and adjusted for a fixed overall gain, or total amplification, and the output signal strength may be controlled by adjustment of the resistance across the primary winding of the receiver input transformer. This tends to keep all circuit components in correct relative adjustment and is an aid to standardization.

The transmitter and receiver of both the systems of Figs. 2 and 4 and of Figs. 5 and 6 may use the same set of ground connections if a switch or relay is provided to connect the ground leads with the transmitter for talking and with the receiver for listening.

The transmitting arrangement of Fig. 2 may be utilized for transmission of pulses which are modified in length in accordance with the modulation by suitably applying the modulating current to control electrodes of tubes 1 and 2. The pulse length modulated signals may be received with the receiver of Fig. 6 if the frequency modulation detector shown there is replaced by an amplitude modulation detector and the amplifier 24 is made to operate without limiting. By the application of threshold and limiting effects in the pulse amplifiers, before the pulses are integrated in a frequency selective circuit, it is possible to eliminate substantially all effects of noise and interference so long as the pulse amplitude is more than twice the peak amplitude of the noise and interference and the threshold and limiting amplifier is adjusted so that the transition from no response to full response takes place at inputs about equal to half the pulse amplitude.

Additional detail circuit arrangements, portions of which may be utilized in carrying out my new system of communication will be found in my prior patent applications and patents as follows:

| Application No. | Filed |
| --- | --- |
| 427,266 | Jan. 19, 1942 |
| 423,881 | Dec. 22, 1941 |
| 367,688 | Nov. 29, 1941 |
| 371,865 | Dec. 27, 1940 |

| Patent No. | Filed |
| --- | --- |
| 1,898,181 | Mar. 23, 1928 |
| 1,813,922 | Jan. 30, 1929 |

Where water is used to replace the soil for a ground, as in the case where the transmitter would be located on a submarine, the two ground electrodes will, of course, be spaced far apart, as in the case when actual soil is employed for ground. The submarine hull can constitute one electrode, while another electrode can be located at the end of a long insulated conductor run out from the submarine.

What is claimed is:

1. The method of earth communication which comprises producing pulses of electrical energy of short duration and with relatively long time periods between pulses, causing said pulses to pass solely through the earth as a conducting medium, and differentially varying the timing of successive pulses in accordance with the intelligence to be transmitted without changing the average pulse rate.

2. A communication system comprising a pair of spaced ground points, a source of polarizing potential connected to one of said ground points through a high inductance reactor, a pair of vacuum tubes each having an anode, a cathode and a grid, a direct connection between the anodes of said tubes, a direct connection between that terminal of said reactor which is nearest to said one ground point and said anodes, a direct connection between said cathodes, a source of constant frequency current, and a source of modulating current, means for coupling said grids in opposed phase relation to both of said last sources of current, whereby the currents supplied to one grid by either source has a 180° phase relation relative to the currents supplied to the other grid by the same source, means for biasing said grids negatively with respect to said cathodes to such a value that the tubes are alternately conductive for a large portion of each positive half cycle of constant frequency alternating current supplied to the grids, and both tubes are non-conductive simultaneously for only short periods of time during which the currents from said source of constant frequency current are near their zero values, whereby said source of polarizing potential supplies relatively short high polarizing potentials to said ground points solely during the time both tubes are non-conductive.

3. In a constant current earth transmitter modulation system, means for producing high power pulses of direct current and short duration compared to the time interval between pulses, and a source of modulation current coupled to said means in such manner as to vary the timing of successive pulses without changing the average pulse rate, and an output circuit for said system comprising a transformer having a secondary winding and a pair of connections coupled at one end to said secondary winding and connected at the other end directly to ground at spaced points.

4. A system in accordance with claim 2, characterized in this that said source of modulating current includes a telephone system with an effective frequency range from substantially 150 cycles to 3000 cycles.

5. The method of earth communication which comprises producing pulses of electrical energy of high power at a rate of substantially 20,000 cycles per second, each pulse having a length of substantially 0.5 microsecond, causing said pulses to pass solely through the earth as a conducting medium for transmission to a remote receiving station, and differentially varying the timing of successive pulses in accordance with the intelligence to be conveyed without changing the average pulse rate.

6. The method of earth communication which comprises producing equal length pulses of electrical current, causing said pulses to pass solely through the earth as a conducting medium for transmission to a remote receiving station, and shifting the time of occurrence of individual equal length pulses without changing the average pulse rate, in accordance with the intelligence to be transmitted.

7. In a constant current earth transmitter modulation system, means for producing high power pulses of direct current of short duration compared to the time interval between pulses comprising a pair of electron discharge devices excited differentially by means of a constant amplitude and constant frequency current, a source of modulation current exciting said devices differentially to vary the timing of successive pulses without changing the average pulse rate, an output circuit for said means, said output circuit including a pair of electrodes connected to the earth at spaced points, and a receiver having a pair of spaced earthed electrodes for receiving said pulses, said receiver including a pair of oscillators operating substantially 180° out-of-phase relative to each other and upon which said pulses are impressed, means in circuit with said oscillators for controlling the timing of the operation of said oscillators, whereby each oscillator has a natural period of oscillation substantially equal to half the average pulse rate of the transmitted pulses, and means in common to the output of said oscillators for insuring the phase or timing modulation of said oscillators in accordance with the timing of the received pulses but without varying the oscillation frequency.

8. In a communication system, a transmitter having a pair of spaced ground electrodes for sending out pulses of high power modulated as to time of occurrence, and a receiver having a pair of spaced ground electrodes for receiving said pulses and for impressing them on a wide band amplifier, a pair of oscillators operating substantially 180° out of phase relative to each other and receiving said amplified pulses, means in circuit with said oscillators for controlling the timing of the operation of said oscillators, whereby each oscillator has a natural period of oscillation substantially equal to half the average pulse rate of the transmitted pulses, and means in common to the outpt of said oscillators for insuring the phase or timing modulation of said oscillators in accordance with the timing of the received pulses but without varying the oscillation frequency.

9. Means for receiving earth pulses of current modulated as to time of occurrence, comprising a receiver having a pair of spaced ground points for collecting the pulses, a pair of electron discharge device audio frequency oscillators each having a grid, a cathode and an anode, means coupling the output of said receiver to said grids to apply potentials to said grids in like phase with respect to each other, a connection between said cathodes, time constant circuits coupled to said anodes to control the timing of the operation of said oscillators, said time constant circuits having such values as to cause each of said oscillators to have a natural period of oscillation substantially equal to half the average frequency of the pulses received by said receiver, and a resistor in common to said anodes, whereby the phase or timing of oscillations or each oscillator, but not the oscillation frequency is modulated by the received pulses.

10. A receiving system in accordance with claim 9, characterized in this that the anode of each oscillator is coupled to its grid through an audio frequency transformer, and the time constant circuit for each oscillator includes a condenser and a resistor through which the condenser is charged.

11. An earth signalling system comprising, in combination, a transmitter having a pair of spaced electrodes connected to ground, means for impressing upon said spaced electrodes high power unidirectional pulses of electrical energy of short duration of the order of ten microseconds and less and with relatively long time periods between pulses, whereby said pulses are transmitted through the ground, a source of modulating current coupled to said transmitter for modulating a characteristic of said pulses, and a receiver having an energy collector in the form of a pair of spaced electrodes connected to ground, said receiver including a wide band amplifier coupled to said last electrodes.

12. An earth signalling system comprising a transmitter having a pair of spaced electrodes connected to ground, means for impressing upon said spaced electrodes high power unidirectional pulses of electrical energy of short duration and with relatively long time periods between pulses, whereby said pulses are transmitted through the ground, and a source of modulating current coupled to said transmitter for modulating the frequency of said pulses.

13. An earth signalling system comprising, in combination, a transmitter having a pair of spaced electrodes connected to ground, means for impressing upon said spaced electrodes high power pulses of electrical energy of short duration and with relatively long time periods between pulses, a source of modulating current coupled to said transmitter for modulating the frequency of said pulses, and a receiver having an energy collector in the form of a pair of spaced electrodes connected to ground, said receiver including an amplifier coupled to said last electrodes, a frequency selective circuit in the output of said amplifier and tuned to the means pulse frequency but broad enough to respond to the frequency modulation of the pulses, an amplitude limiter coupled to said selective circuit, and a frequency modulation detector coupled to the output of said limiter.

14. A system in accordance with claim 11, characteristic in this, that means are provided for operating said receiver synchronously with said transmitter.

15. The method of earth communication which comprises producing pulses of short duration and with relatively long time periods between pulses and at a rate of the order of 20,000 per second, causing said pulses to pass solely through the earth as a conducting medium for transmission to a remote receiving station, and differentially varying the timing of successive pulses in accordance with the intelligence to be transmitted without changing the average pulse rate.

16. In an earth transmitter modulation system, means for producing high power pulses of electrical energy of short duration compared to the time interval between pulses, said means comprising a pulse generator electrode structure including a regenerative feed-back circuit and an amplifier electrode structure for amplifying the output of said first structure, means for modulating the frequency or rate of pulses produced by said pulse generator electrode structure in accordance with the intelligence to be transmitted, and an output circuit for said system comprising a transformer having a primary winding coupled to said amplifier structure and a secondary winding coupled to a pair of spaced ground electrodes.

17. In a communication system, a transmitter having an output circuit for sending out over the earth pulses of power modulated as to time of occurrence, and a receiver having an energy collecting circuit for receiving said pulses and for impressing them on an amplifier, a pair of oscillators operating substantially 180° out of phase relative to each other and coupled to the output of said amplifier, means in circuit with said oscillators for controlling the timing of the operation of said oscillators, whereby each oscillator has a natural period of oscillation substantially equal to half the average pulse rate of the transmitted pulses, and means in common to the output of said oscillators for insuring the phase or timing modulation of said oscillators in accordance with the timing of the received pulses but without varying the oscillation frequency.

18. The method of earth communication by means of a transmitter having spaced electrodes connected to ground which comprises impressing upon said spaced electrodes unidirectional pulses of electrical energy whose duration is short compared to the time between successive pulses, and modulating a characteristic of said pulses in accordance with the intelligence to be transmitted.

19. The method of communication which, by means of a transmitter having spaced electrodes connected to ground, comprises impressing upon said spaced electrodes high power direct current pulses of electrical energy whose duration is short compared to the time between successive pulses, and modulating a characteristic of said pulses in accordance with the intelligence to be transmitted.

20. The method of communication by means of a transmitter having spaced electrodes connected to ground, which comprises impressing upon said spaced electrodes unidirectional pulses of electrical energy whose duration is short compared to the time between successive pulses, and modulating the frequency of the pulses in accordance with the intelligence to be transmitted.

CLARENCE W. HANSELL.